O. J. BOOS, HORACE BOOS & HENRY BOOS.
TRAY DISCHARGE FOR CONVEYERS.
APPLICATION FILED NOV. 24, 1915.
1,270,000.
Patented June 18, 1918.
2 SHEETS—SHEET 1.
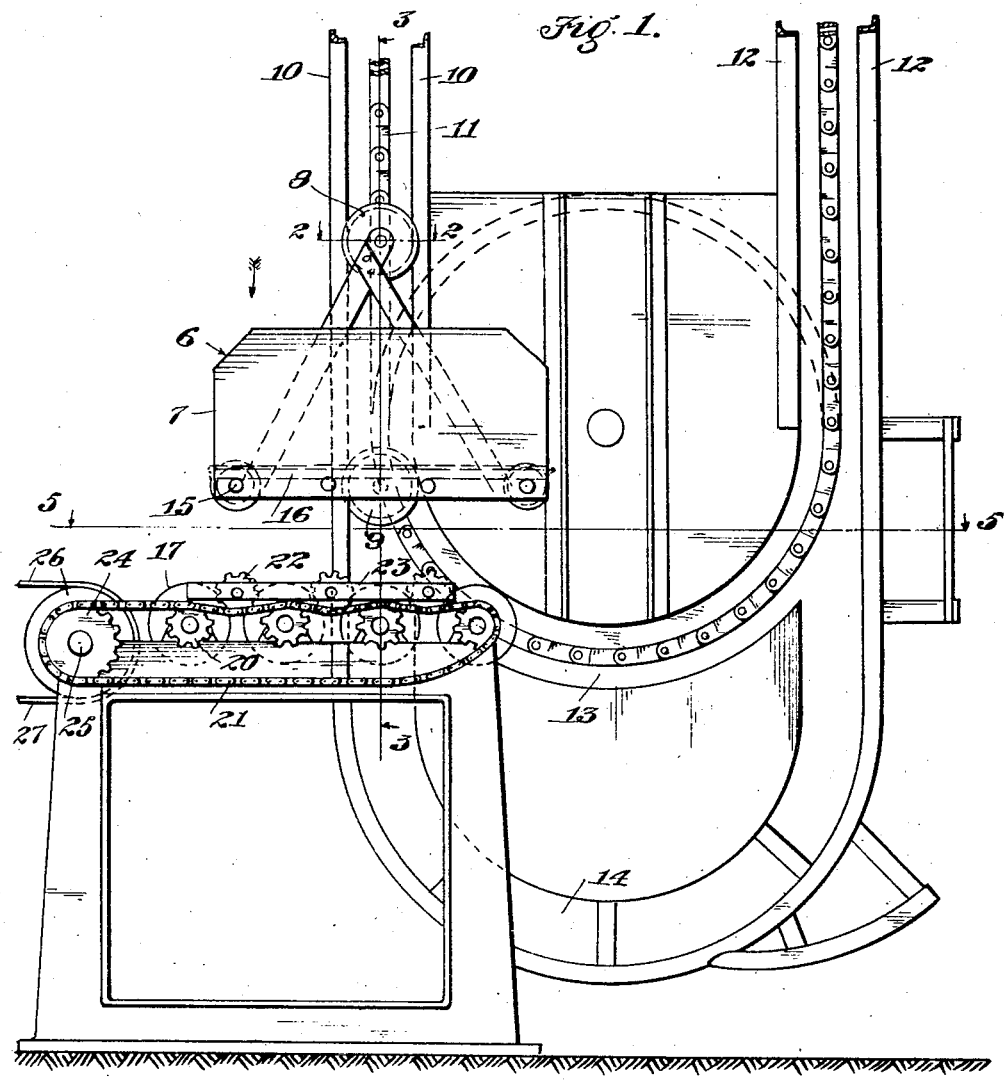
Inventors.
Orlando J. Boos.
Horace Boos.
Henry Boos.
by Hazard Berry and Miller
atty's.

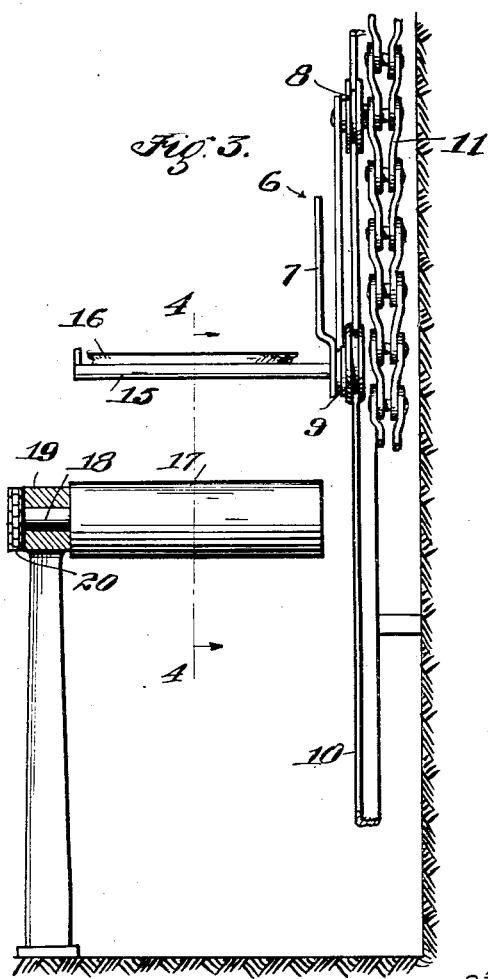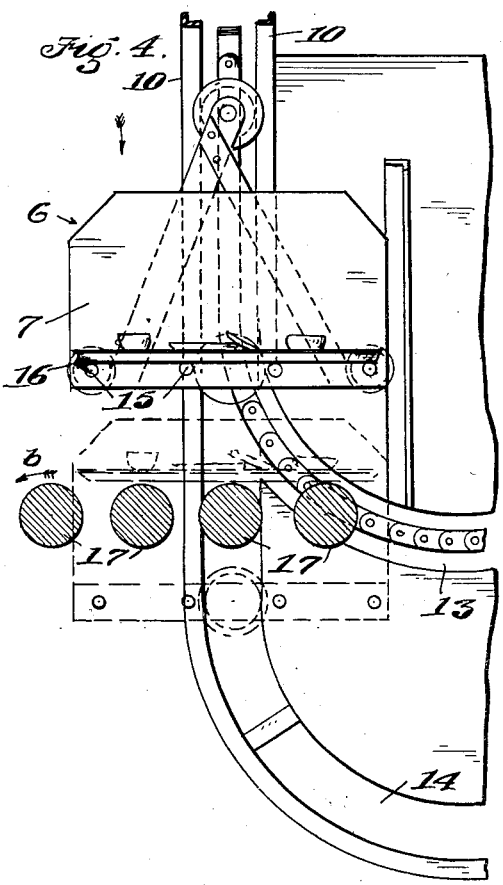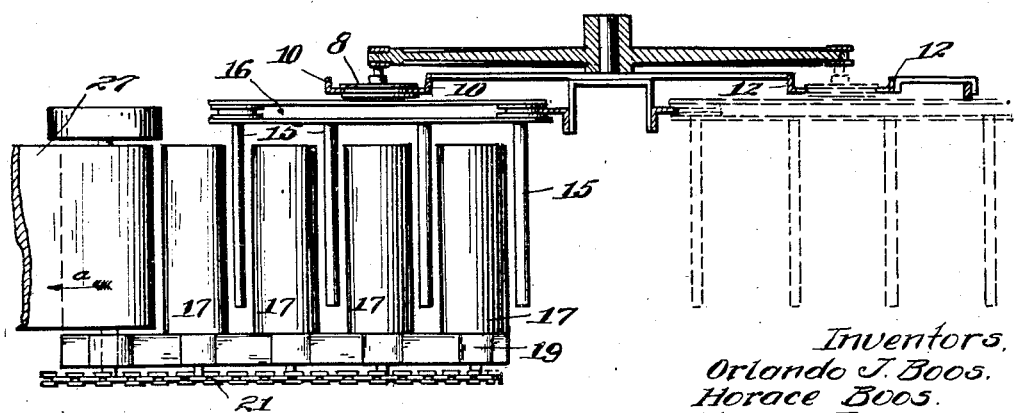

UNITED STATES PATENT OFFICE.

ORLANDO J. BOOS, HORACE BOOS, AND HENRY BOOS, OF LOS ANGELES, CALIFORNIA.

TRAY-DISCHARGE FOR CONVEYERS.

1,270,000.   Specification of Letters Patent.   Patented June 18, 1918.

Application filed November 24, 1915. Serial No. 63,340.

*To all whom it may concern:*

Be it known that we, ORLANDO J. BOOS, HORACE BOOS, and HENRY BOOS, citizens of the United States, residing at Los Angeles, in the county of Los Angeles and State of California, have invented new and useful Improvements in Tray-Discharges for Conveyers, of which the following is a specification.

Our invention relates to a tray-discharging mechanism for conveyers.

It is the object of this invention to provide a mechanism for automatically discharging a tray or the like from a downwardly moving carriage of a vertical conveyer.

Another object is to provide a mechanism for removing a tray or similar object from a downwardly moving carriage and automatically transferring it to a horizonal conveyer.

A further object is to provide a tray-discharging and transferring mechanism which embodies a plurality of spaced rollers so arranged in relation to a tray-supporting carriage that the downward movement of the carriage will deposit a tray thereon upon the rollers, and to also provide a simple and effective means for rotating the rollers to advance the tray thereon and deliver it to a horizontal conveyer.

Other objects will appear hereinafter.

Our invention is illustrated in the accompanying drawings in which:

Figure 1 is a view in elevation showing the invention as applied and illustrating the tray-conveying carriage as moving downwardly and about to deliver the tray to the discharging and transferring mechanism.

Fig. 2 is an enlarged detailed horizontal section on the line 2—2 of Fig. 1 illustrating the mounting of the carriage on its vertical guide-way.

Fig. 3 is a view in vertical section and elevation on the line 3—3 of Fig. 1, as seen in the direction indicated by the arrows.

Fig. 4 is a detail vertical section and elevation on the line 4—4 of Fig. 3, as seen in the direction indicated by the arrows.

Fig. 5 is a horizontal section and plan view as seen on the line 5—5 of Fig. 1, illustrating the manner of delivering the tray to the discharging and transferring rollers.

More specifically, 6 indicates a vertically movable carriage which may be of any suitable construction but is here shown as comprising a back member 7 which is equipped with a pair of vertical spaced superposed rollers 8 and 9 on its rear face adapted to travel between parallel vertically disposed rails 10 forming a perpendicular guide-way. The carriage is suitably attached to an endless chain or belt 11 which rotates in any desired manner to move the carriage downwardly on the guide rails 10 and to transfer it from the lower end of the guide rails 10 to a second pair of vertically disposed guide rails 12 along which the carriage is conveyed upwardly. Means are provided for maintaining the carriage in a normal horizontal position while passing from the lower end of the guide rails 10 to the lower end of the guide rails 12, which is here shown as comprising a pair of spaced arcuate guide-ways 13 and 14 adapted to receive the rollers 8 and 9, respectively, in such manner that the carriage will traverse the downward and upward curves of the guide-ways 13 and 14 in a normal horizontal position. Projecting from the back member 7 of the carriage is a series of horizontally extending spaced tray carrying bars 15 adapted to support a tray or similar object 16, as indicated in dotted lines in Fig. 1.

The bars 15 are thus rigidly connected together and supported solely at their inner ends and project from the carriage in forked arrangement.

The essence of the present invention resides in a means for automatically removing the tray from its supporting bars 15 and discharging it horizontally out of the path of travel of a succeeding downwardly-moving carriage. This discharging means comprises a plurality of spaced horizontally extending rollers 17 which are so spaced in relation to each other and to the bars 15 on the carriage 6 that on downward movement of the carriage a number of bars will pass between the rollers, as particularly shown in Fig. 5. The rollers are arranged with their axes extending lengthwise of the bars 15 and thus are adapted to rotate in a direction transverse of the bars. In order to permit the bars 15 to pass between the rollers 17, it is necessary that the latter be supported only at their outer ends, and each roller 17 is therefore provided with a stud shaft 18 which is supported in a suitable bearing 19, as shown in Fig. 3. The rollers 17 are arranged with their upper faces on the same plane and with their inner ends terminating adjacent the vertical path of travel of the back member 7 of the carriage 6. Mounted on the outer end of each of the stud shafts 18 is a sprocket gear 20 over which the upper portion of the sprocket chain 21 passes in engagement therewith; the sprocket chain being maintained in engagement with the sprocket wheels 21 by means of idler sprocket wheel 22 carried on a frame 23 and arranged to bear upon and engage the sprocket chain 21 intermediate the sprocket wheels 20, as particularly shown in Fig. 1. The sprocket chain 21 passes around and is adapted to be driven by a sprocket wheel 24 carried on a shaft 25 on which a roller 26 is mounted; the roller 26 being provided to receive a conveyer belt 27, the upper leaf of which is arranged substantially on the plane of the uppermost portions of the rollers 17. The conveyer belt 27 may be caused to travel from any suitable source of power and is designed to move in the direction indicated by the arrow $a$ in Fig. 5, so as to rotate the chain 21 and the rollers 17 in a corresponding direction.

In the operation of the invention, as the carriage 6 moves downwardly, the bars 15 thereon pass between the rollers 17 so as to deposit the tray 16 on said rollers as the bars on the carriage pass below the rollers on continued downward movement of the carriage. The rotation of the rollers 17 in the direction indicated by the arrow $b$ in Fig. 4, causes the tray to advance horizontally out of the path of travel of a succeeding carriage; the tray being advanced by the rollers until it is engaged by the upwardly moving portion of the conveyer belt 27 to which the tray is thus transferred. The conveyer belt 27 then operates to deliver the tray to any suitable point of discharge.

We claim:

1. A discharge mechanism for conveyers comprising the combination with a vertically movable carriage and a series of rods projecting horizontally therefrom, of a plurality of horizontally extending rollers supported only at their ends, between which said rods are adapted to pass on downward movement of the carriage to deposit an article supported on said rods upon the rollers, and means for rotating said rollers from their supported ends to advance the article deposited thereon in a horizontal direction.

2. A tray discharging and transferring mechanism comprising the combination of a carriage having a series of horizontally projecting tray supporting rods thereon, a series of horizontally extending rollers supported only at their outer ends so arranged that the rods will pass between the rollers on their downward movement, a stud shaft on the outer end of each roller, bearings for the stud shafts, sprocket wheels on each of said stud shafts, a sprocket chain having its upper portion engaging the sprocket wheels, means for retaining the sprocket chain in engagement with the sprocket wheels, and means for rotating the sprocket chain to revolve the rollers to advance a tray thereon.

3. A discharge mechanism for conveyers comprising the combination with a vertically movable carriage and a plurality of horizontally projecting tray supporting rods thereon, a series of horizontally extending rollers supported only at their outer ends, between which said rods are adapted to pass on downward movement of the carriage, a horizontal conveyer belt on a plane with the upper portions of said rollers, and means for rotating the belt and rollers in the same direction.

4. A discharge mechanism for conveyers, comprising the combination with a vertically movable plate and bars in forked arrangement carried thereby, of a series of rollers between which the bars pass, arranged to rotate transversely of the bars, said rollers being supported only at their outer ends to permit the bars to pass therebetween and transversely thereunder.

5. In a discharge mechanism for conveyers, the combination with a plate mounted to traverse a vertical and horizontal path of travel having a series of horizontally extending spaced rods thereon, of a series of rollers between which the rods pass on the vertical movement of the plate and beneath which the rods pass on the horizontal movement of the plate.

In testimony whereof we have signed our names to this specification.

ORLANDO J. BOOS.
HORACE BOOS.
HENRY BOOS.